United States Patent
Yamada

[11] Patent Number: 6,145,366
[45] Date of Patent: Nov. 14, 2000

[54] RAM CONTROL METHOD AND RAM CONTROL SYSTEM FOR PRESS BRAKE

[75] Inventor: Yukihiro Yamada, Komatsu, Japan

[73] Assignees: Komatsu Ltd.; Komatsu Industries Corporation, both of Tokyo, Japan

[21] Appl. No.: 09/308,694

[22] PCT Filed: Oct. 29, 1997

[86] PCT No.: PCT/JP97/03959

§ 371 Date: May 24, 1999

§ 102(e) Date: May 24, 1999

[87] PCT Pub. No.: WO98/23399

PCT Pub. Date: Jun. 4, 1998

[30] Foreign Application Priority Data

Nov. 29, 1996 [JP] Japan .................................. 8-319946
Nov. 29, 1996 [JP] Japan .................................. 8-319947

[51] Int. Cl.[7] ............................................. B21J 9/20
[52] U.S. Cl. ............................. 72/443; 72/1; 72/441
[58] Field of Search ........................ 72/441, 442, 443, 72/1

[56] References Cited

U.S. PATENT DOCUMENTS 5,027,631  7/1991  Naito .................................. 72/441
5,031,431  7/1991  Naito .................................. 72/443

FOREIGN PATENT DOCUMENTS 62-202999  12/1987  Japan .
3-81099    4/1991   Japan .
5-138254   6/1993   Japan .
6-154871   6/1994   Japan .
6-315720   11/1994  Japan .
7-275943   10/1995  Japan .

*Primary Examiner*—David Jones
*Attorney, Agent, or Firm*—Armstrong, Westerman, Hattori, McLeland & Naughton

[57] ABSTRACT

Damage to the dies due to a die collision caused by an input error of bending data etc. is avoided without use of a specialized device for pressure detection. A die interference checking mode is provided for setting the pressure of the ram, which supports the movable die, to a value that does not cause damage in the event that the movable die and the fixed die interfere with each other and for driving the ram so as to create the set pressure. A die interference determining step is further provided in which it is determined whether the movable die and the fixed die have interfered with each other in the die interference checking step, and if it is determined that the dies have interfered, the movement of the ram is stopped, and if it is determined that the dies have not interfered, the die interference checking step is cancelled and the operation of the press brake proceeds to an ordinary bending step.

7 Claims, 9 Drawing Sheets

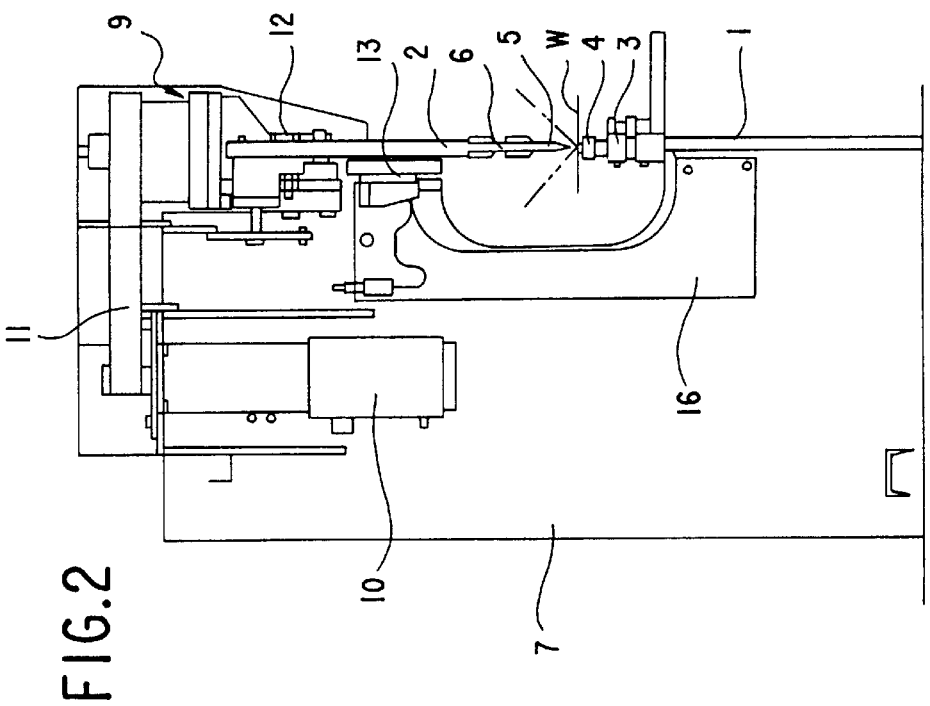
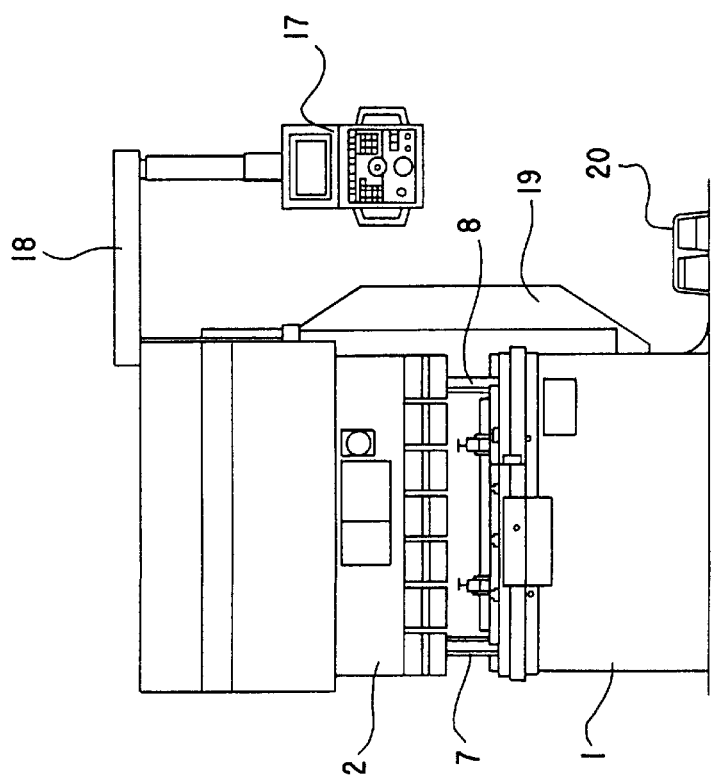

FIG. 4

| NC PARAMETERS | DIFFERENCE COUNT LIMIT | | FAST DESCENDING TORQUE |
|---|---|---|---|
| | PRESSURE DATA | | LOWEST TORQUE |
| | SPEED DATA | | ASCENDING TORQUE |
| | ACCELERATION / DECELERATION TIME DATA | | LOWEST TORQUE MOVING SPEED |
| | POSITIONING LOOP GAIN | | |
| USER SETTING DATA | SPEED DATA | | FAST DESCENDING SPEED |
| | DRIVING DATA 1 | | ASCENDING SPEED |
| | DRIVING DATA 2 | | |
| | DRIVING DATA 3 | | UPPER LIMIT POSITION |
| | DRIVING DATA 4 | | SLOW MOVEMENT STARTING POSITION |
| | DRIVING DATA 5 | | LOWER LIMIT POSITION |
| | | | BENDING PRESSURE |
| | | | BENDING SPEED |

RAM CONTROL METHOD AND RAM CONTROL SYSTEM FOR PRESS BRAKE

TECHNICAL FIELD

The present invention relates to a ram control method and ram control system for use with a press brake which bends a sheet-like workpiece by the cooperative movement of a movable die and a fixed die, the movable die being supported and driven by a ram, while the fixed die being supported on a fixed bed in opposing relationship with the movable die.

BACKGROUND ART

When using dies under pressure more than an allowable value in a press brake, there is the risk of breakage which is very dangerous for the operator. Therefore, press brakes of the above type are generally provided with an overload protector which restricts the pressure of the ram for driving the movable die so as not to exceed an allowable value.

One of conventional overload protectors is disclosed in Japanese Patent Publication (KOKAI) Gazette No. 6-154871 (1994) according to which the pressure applied between the upper and lower dies is detected and if it is determined from the detected value that an abnormal condition or overload condition has occurred, the press brake is brought to an emergency stop.

Although the pressure can be constantly checked in the method disclosed in this publication, it disadvantageously requires a specialized device for pressure detection. In addition, a pressure high enough to cause die breakage is exerted between the upper die (punch) and the lower die (die) until an abnormal condition is detected and the dies are, therefore, susceptible to damage. In cases where the ram which supports the movable die is driven by servo motors, the ram moves at high speed. Therefore, there is the possibility that the pressure caused by the movement of the ram cannot be detected in time so that the dies will be broken before detecting overload.

The present invention is directed to overcoming the foregoing problems, and the prime object of the invention is therefore to provide a ram control method and a ram control system adapted for use in a press brake, which are capable of avoiding the risk of die breakage due to collision caused by input errors of bending data, without use of an additional, specialized device for pressure detection.

DISCLOSURE OF THE INVENTION

According to the invention, the above object can be accomplished by a ram control method for a press brake which bends a sheet-like workpiece by the cooperative movement of a movable die and a fixed die, the movable die being supported and driven by a ram, while the fixed die being supported on a fixed bed in opposing relationship with the movable die, the control method comprising a die interference checking step for setting the pressure of the ram to a certain limit value which does not cause damage in the event that the movable die and the fixed die interfere with each other and setting the moving speed of the movable die to a lowest torque moving speed according to the set limit value and for driving the ram to exert the set pressure.

The method of the invention includes a die interference checking step, in which if there is the chance of interference between the movable die and the fixed die, for instance, at a start of operation, the pressure of the ram which supports the movable die is set to such a certain limit value that does not cause damage in the event of interference between the movable die and the fixed die and the ram is driven so as to create the set pressure at a lowest torque moving speed determined from the set pressure. The provision of the die interference checking step makes it possible to check, before starting an actual bending operation, whether or not the movable die and the fixed die will interfere with each other. With this arrangement, the collision of the dies due to an error made by the operator in the entry of bending data or in die alignment can be prevented. Additionally, since the moving speed of the ram is controlled, the operator can easily interrupt the operation whenever he feels danger. Not only can die breakage and therefore damage to the machine body be prevented, but also the operator endangered by die breakage can be protected.

Preferably, the invention includes a die interference determining step in which it is determined whether the movable die and the fixed die have interfered with each other in the die interference checking step, and if it is determined that the dies have interfered, the movement of the ram is stopped, and if it is determined that the dies have not interfered, the die interference checking step is cancelled so that the operation of the press brake proceeds to an ordinary bending step. With such a die interference determining step, it is determined whether the movable die and the fixed die have interfered with each other during the movement of the ram in the die interference checking step. If it is determined that the interference has occurred, the movement of the ram is stopped. On the other hand, if it is determined that no interference has occurred, the die interference checking step is then cancelled to let the operation of the press brake proceed to the ordinary bending step. In this way, an abnormal condition is reliably disposed so that the danger of die collision can be more securely eliminated.

A first form of the ram control system of the invention is adapted for use in a press brake which bends a sheet-like workpiece by the cooperative movement of a movable die and a fixed die, the movable die being supported and driven by a ram, while the fixed die being supported on a fixed bed in opposing relationship with the movable die, the control system comprising:
(a) pressure limit setting means for setting the limit of pressure exerted on the movable die to a value which does not cause damage in the event that the movable die and the fixed die interfere with each other;
(b) the moving speed setting means for setting a moving speed of the movable die to a lowest torque moving speed based on the limit value set by the pressure limit setting means; and
(c) ram driving means for driving the ram at the moving speed set by the moving speed setting means.

In the first form of the ram control system, if there is the chance of interference between the movable die and the fixed die, for instance, at a start of operation, the pressure limit setting means sets the pressure of the ram, which supports the movable die, to such a value that does not cause damage in the event of interference between the movable die and the fixed die. Based on the pressure limit value thus set, the moving speed setting means sets a moving speed for the movable die. Then, the ram driving means drives the ram at the set moving speed. With this arrangement, even if the operator made a mistake in inputting bending data or in die alignment, the danger of a collision between the dies can be avoided since the moving speed of the ram is controlled. In addition, the operator can easily interrupt the operation whenever he feels danger.

A second form of the ram control system of the invention is adapted for use in a press brake which bends a sheet-like workpiece by the cooperative movement of a movable die and a fixed die, the movable die being supported and driven by a ram, while the fixed die being supported on a fixed bed in opposing relationship with the movable die, the control system comprising:
(a) pressure limit setting means for setting the limit of pressure exerted on the movable die to a value which does not cause damage in the event that the movable die and the fixed die interfere with each other;
(b) moving speed setting means for setting a the of the movable die to a lowest torque moving speed based on the limit value set by the pressure limit setting means;
(c) interference determining means for determining whether the movable die and the fixed die have interfered with each other while the ram being driven at the moving speed set by the moving speed setting means; and
(d) ram controlling means for stopping the movement of the ram if the interference determining means has determined that the movable die and the fixed die interfered with each other and for controlling the movement of the ram so as to let the operation of the press brake go into an ordinary bending step if the interference determining means has determined that the movable die and the fixed die did not interfere with each other.

In the second form of the ram control system, if there is the chance of interference between the movable die and the fixed die, for instance, at a start of operation, the pressure limit setting means sets the pressure of the ram, which supports the movable die, to such a value that does not cause damage in the event of interference between the movable die and the fixed die. Based on the pressure limit value thus set, the moving speed setting means sets a moving speed of the movable die. Then, the ram is driven at the moving speed set by the moving speed setting means. Whether interference between the movable die and the fixed die has occurred during the driving of the ram is determined by the interference determining means. If it is determined that the interference has occurred, the ram controlling means stops the movement of the ram. On the other hand, if it is determined that the interference has not occurred, the ram is controlled by the ram controlling means so as to let the operation of the press brake proceed to an ordinary bending step. With this arrangement, even if the operator made a mistake in inputting bending data or in die alignment, the danger of a collision of the dies can be avoided since it is determined beforehand whether the movable die and the fixed die would interfere with each other. In addition, the operator can easily interrupt the operation whenever he feels danger.

The interference determining means of the invention may determine whether the movable die and the fixed die have interfered with each other from the difference between the present moving speed of the ram and a target moving speed. Alternatively, the interference determining means may determine the interference of the dies, from the position of the ram when the pressure created by the ram has exceeded a specified threshold, or from the position of the ram when the moving time of the ram has exceeded a specified threshold.

BRIEF DESCRIPTION OF THE DRAWINGS

FIGS. 1 to 7 are associated with a first embodiment of the invention.

FIG. 1 is a front view of a press brake.

FIG. 2 is a side view of the press brake.

FIG. 3 is a block diagram showing the control system structure of the press brake.

FIG. 4 shows a data storage area in an NC device.

FIG. 5 is a flow chart of a determination routine performed when the press brake is in a die interference checking mode.

FIG. 6 is a flow chart of a process performed for one stroke of a ram.

FIG. 7(*a*) is a performance chart of the ram when the press brake is in the die interference checking mode.

FIG. 7(*b*) is a performance chart of the ram when the press brake is in an ordinary bending mode.

FIG. 8 is a flow chart of a process performed for one stroke of a ram.

FIG. 9 is a block diagram showing in detail a process performed in an NC device.

FIG. 10 is a flow chart of a die collision determination routine.

BEST MODE FOR CARRYING OUT THE INVENTION

Figure 3:
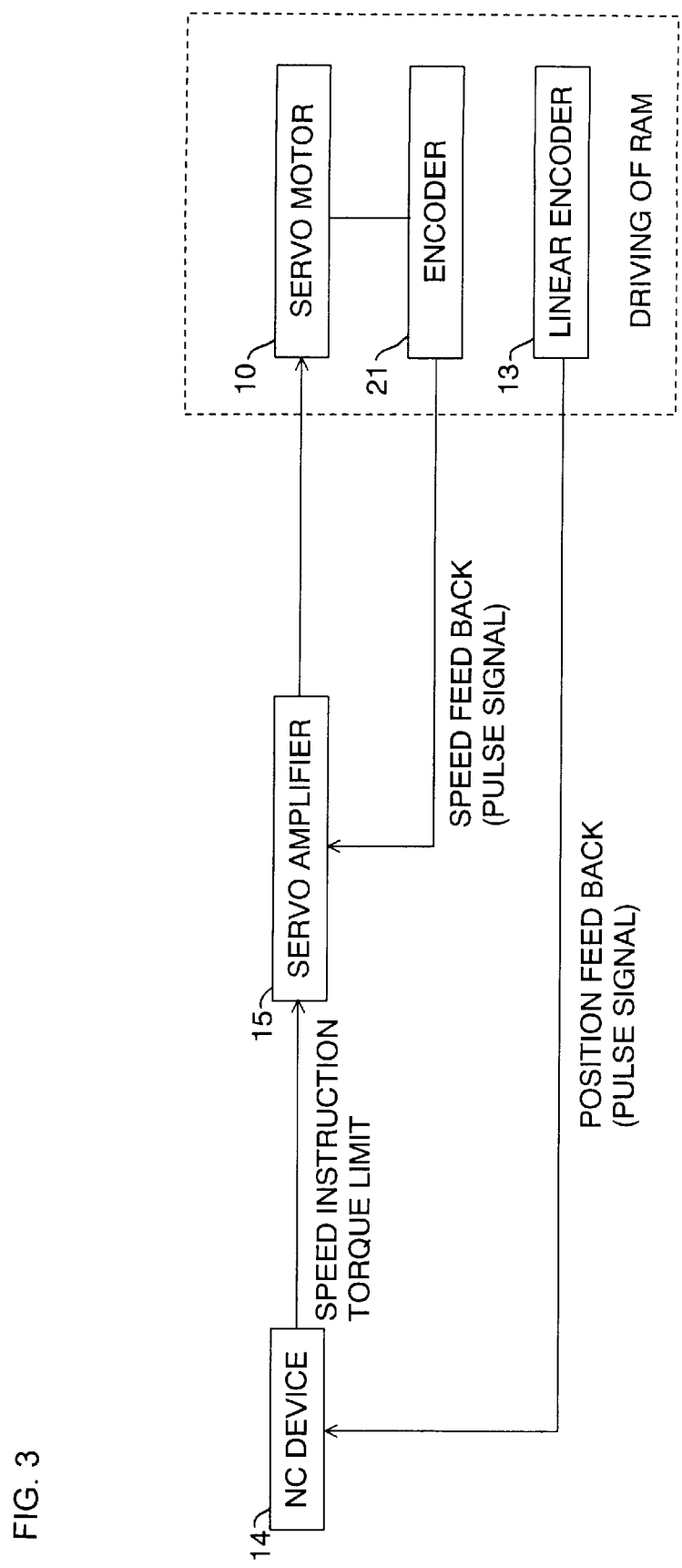

Referring now to the drawings, the ram control method and ram control system for a press brake of the invention will be described according to preferred embodiments.

(First Embodiment)

FIGS. 1 and 2 are a front view and a side view, respectively, of a press brake constructed according to the first embodiment of the invention. FIG. 3 shows the control system structure of the invention.

The press brake of the present embodiment comprises a fixed bed 1 and a ram 2 which is in opposing relation with the bed 1 and driven so as to rise and lower. A die (lower die) 4 having a V-shaped groove is supported on the top of the bed 1 by means of a die holder 3, while a punch (upper die) 5 is attached to the underside of the ram 2 by a punch holder 6 so as to face the die 4.

A pair of side frames 7, 8 are disposed on the respective ends of the bed 1 in an integral fashion and a support frame is disposed so as to connect the respective upper ends of the side frames 7, 8. The support frame has a plurality of ram driving units (two units in this embodiment) 9 attached thereto. The ram 2 is connected to the respective lower ends of the ram driving units 9. The ram 2 is raised or lowered by the operation of the ram driving units 9, thereby bending a workpiece W inserted between the punch 5 and the die 4.

AC servo motors 10 are disposed behind the ram driving units 9 as their driving sources. The driving forces of the AC servo motors 10 are transmitted to ball screws 12 coupled to the ram 2 through timing belts 11. The ball screws 12 convert the rotary driving forces into vertically working forces which are then imposed on the workpicce W as pressing force (pressure).

The position of the ram 2 in a vertical direction is detected by linear encoders 13 which are disposed at the positions corresponding to the positions of the drive shafts of the ram driving units 9. The detection data of these encoders are input to an NC device 14 (see FIG. 3). According to the vertical position of the ram 2 at the positions (hereinafter referred to as "shaft-load imposed points") corresponding to the respective positions of the drive shafts, the servo motors 10 are feed-back controlled through servo amplifiers 15. The linear encoders 13 are supported by a correction bracket 16 composed of two side plates positioned beside the side frames 7, 8 and a beam for connecting these right and left side plates. By virtue of this arrangement, the linear encoders 13 are unaffected by the deformation of the side frames 7, 8 due to changes in load and can measure the absolute position of the ram 2 at each shaft-load imposed point.

Suspended from the support frame through a turnable arm 18 are an input/output device for inputting and outputting bending data etc.; the NC device 14 for performing arithmetic operation based on various data; and an operation panel 17 which includes a display unit for displaying various data. A control panel 19 including controllers such as servo amplifiers is attached to the side of a main body frame. There is also provided a foot switch 20 operable by foot on the lower side of the main body frame.

In the NC device 14, the operating position (slow movement starting position and lower limit position) and moving speed of the ram 2 and the pressure (the pressure necessary for bending) of the ram 2 are calculated according to bending data input through the operation panel 17. These pieces of data may be entered by the operator through the operation panel 17.

When the operator sends an operating instruction to the ram 2 by operating the foot switch 20, the NC device 14 provides the servo amplifiers 15 with a speed instruction and an instruction indicating the maximum value of the torque (torque limit) necessary for operating the ram 2. Each servo amplifier 15 releases a driving instruction to the servo motor 10, based on the speed instruction and the torque limit. The output pulse of an encoder 21 built in each servo motor 10 is fed back to the servo amplifier 15. The servo amplifier 15 calculates speed based on the signal from the encoder 21 and controls the servo motor 10 so that the moving speed of the ram 2 becomes close to the value of the speed signal sent from the NC device 14.

A positional feed back signal from the linear encoder 13 is input to the NC device 14 which in turn positions the ram 2 at a target position according to this positional feed back signal. When positioning the ram 2 at the target position, the press brake is controlled according to NC parameters such as acceleration/deceleration time and the gain of a positioning loop. In the data storage area of the NC device 14, various parameters such as shown in FIG. 4 are stored. These parameters are classified into NC parameters which are set by the manufacturer and unrewritable by the user and user setting parameters which are input by the user. The NC parameters include pressure data (fast descending torque, lowest torque, ascending torque), speed data (lowest torque moving speed), acceleration/deceleration time data, positioning loop gain and the like. The user setting data include speed data (fast descending speed, ascending speed), driving data (upper limit, slow movement starting position, lower limit, bending pressure, bending speed) and the like.

Figure 5:
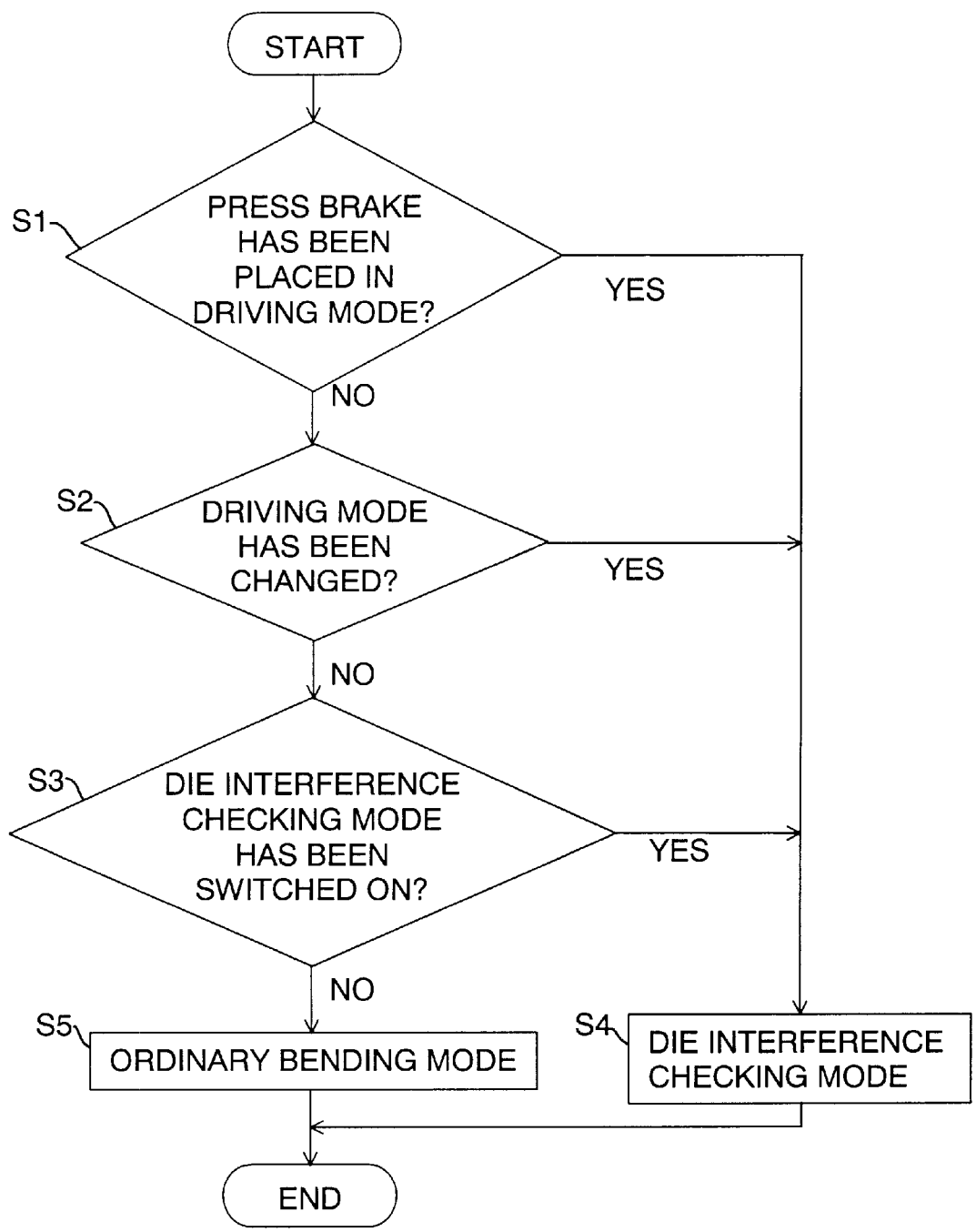

In order to avoid the risk of die collision due to an error made by the operator in the entry of bending data and in die alignment, the press brake constructed according to the invention includes a die interference checking mode in addition to an ordinary bending mode. Whether the die interference checking mode is valid is determined in the determination routine shown in FIG. 5.

In the determination routine, when the operator operates the input/output device to select a driving mode (STEP S1) or to change driving data (STEP S2) or when the operator directly switches on the die interference checking mode (STEP S3), the operation of the press brake goes into the die interference checking mode (STEP S4). If none of the operations (STEPS S1, S2, S3) is performed, the ordinary bending mode is set (STEP S5). It should be noted that the display unit built in the press brake displays whether the die interference checking mode or the ordinary bending mode is presently valid.

Figure 6:
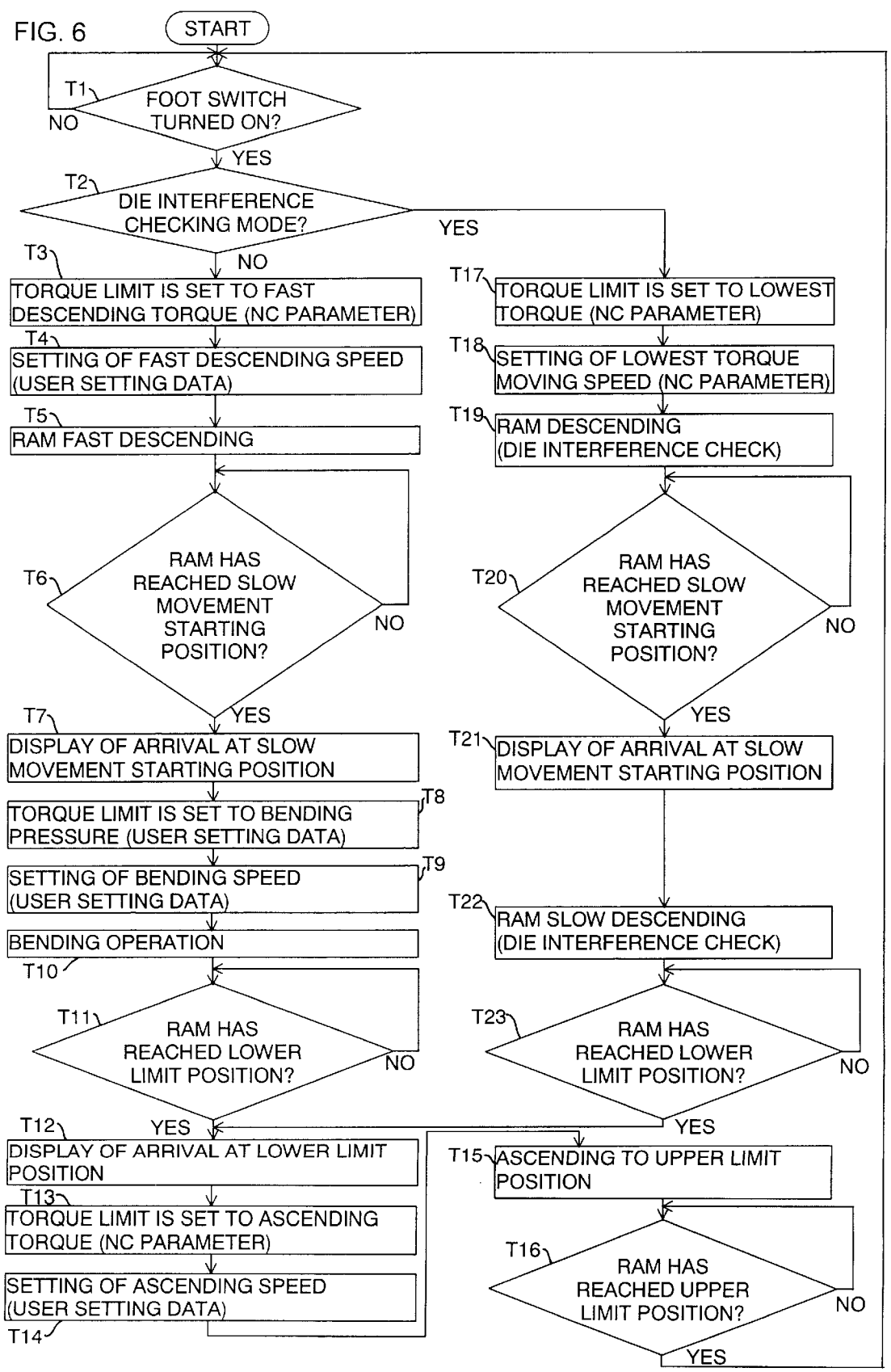

Reference is made to the flow chart of FIG. 6 to describe the process performed for one stroke of the ram 2.

Figure 7:
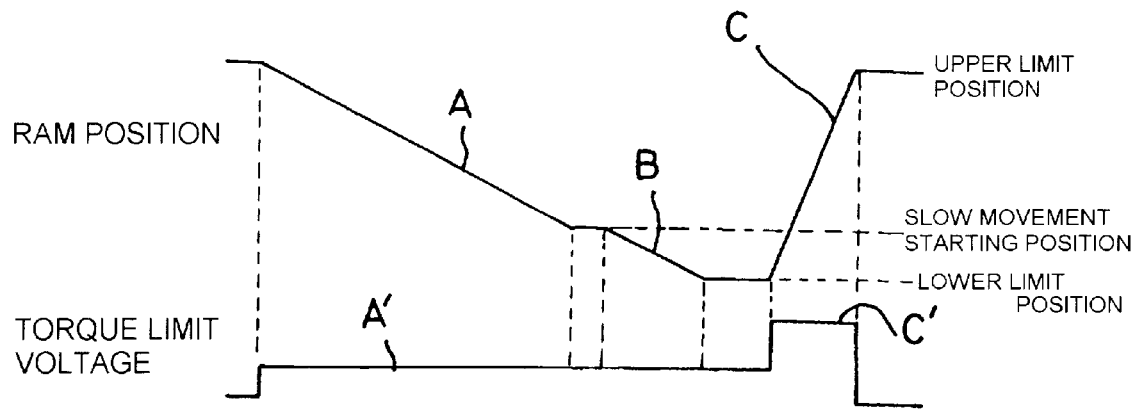
Figure 7:
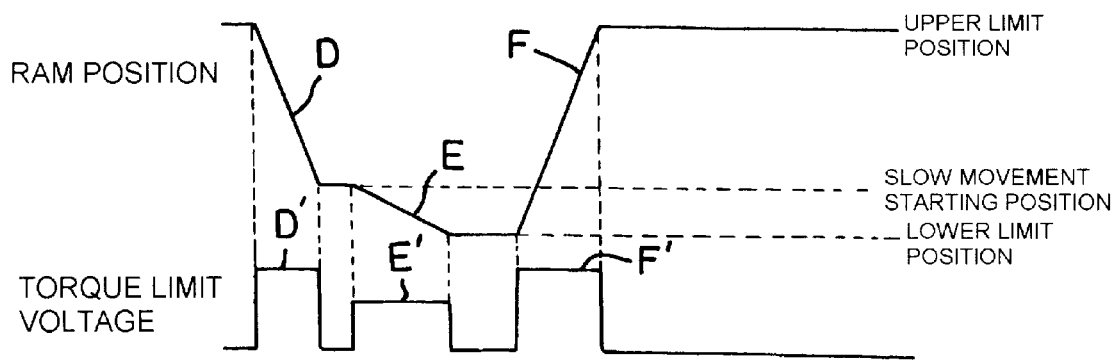

STEPS T1 to T4: After the foot switch 20 has been depressed to start the movement of the ram 2, a check is made in the determination routine shown in FIG. 5 to determine whether the die interference checking mode is selected. If the die interference checking mode is not selected, that is, the ordinary bending mode is selected, the fast descending torque D' of the NC parameters is set as the torque limit (the limit of pressure) of the ram 2 as shown in FIG. 7(b) and the fast descending speed of the user setting data is set as the fast descending speed of the ram 2.

STEPS T5 to T7: For reducing the cycle time, the ram 2 is lowered from the upper limit position to the slow movement starting position at a fast descending speed, thereby making the punch 5 close to the workpiece W and the die 4 (this movement is indicated by line D in FIG. 7(b)). At the time when the ram 2 has reached the slow movement starting position, the arrival of the ram 2 at this position is displayed.

STEPS T8 to T12: After the ram 2 has reached the slow movement starting position, the bending pressure E' of the user setting data is set as the torque limit of the ram 2, and then, bending operation is performed at a slow descending speed so that the ram 2 reaches the lower limit position (this movement is indicated by line E in FIG. 7(b)). At the time when the ram 2 has reached the lower limit position, the arrival of the ram 2 at this position is displayed.

STEPS T13 to T16: After the ram 2 reaching the lower limit position, the ascending torque F' of the NC parameters is set as the torque limit of the ram 2 and the ascending speed of the user setting data is set as the ascending speed of the ram 2. Then, the ram 2 is raised until the ram 2 reaches the upper limit position (this movement is indicated by line F in FIG. 7(b)).

In ordinary bending, the operation is performed according to the performance chart of FIG. 7(b). In cases where there is the danger of die interference, great torque is generated when the ram 2 is in the movements indicated by lines D and F. Even when the press brake is in the movement for bending (this is indicated by line E), great torque is generated in some cases depending on the value of bending pressure set by the operator. If the punch 5 and the die 4 collide with each other at the time of generation of great torque, a great force will be imposed on these dies which is very dangerous. To avoid such an accident, the present embodiment includes the die interference checking mode (STEPS T17 to T23). Next, the die interference checking mode will be explained.

STEPS T17 to T18: If the die interference checking mode is selected, the lowest torque A' of the NC parameters is set as the torque limit (the limit of pressure) of the ram 2 as shown in FIG. 7(a) and the lowest torque moving speed of the NC parameters is set as the moving speed of the ram 2.

STEPS T19 to T21: The ram 2 is lowered from the upper limit position to the slow movement starting position at the set moving speed thereby making the punch 5 close to the workpiece W and the die 4 (this movement is indicated by line A in FIG. 7(a)). At the time when the ram 2 has reached the slow movement starting position, the arrival of the ram 2 at this position is displayed.

STEPS T22 to T23: Subsequently, the ram 2 is moved from the slow movement starting position to the lower limit position with the same set torque A' and at the same set moving speed (line B in FIG. 7(a)). When the ram 2 has reached the lower limit position, the flow proceeds to STEP T12 so that the ram 2 ascends (line C in FIG. 7(a)) with the same ascending torque C' and at the same ascending speed as those of the ordinary bending mode.

As has been described above, the present embodiment is provided with the die interference checking mode. With this mode, where there is the danger of a collision between the punch 5 and the die 4, for instance, at a start of operation, the ram 2 is moved from the upper limit position to the lower limit position with the lowest torque and at the lowest torque moving speed stored in the memory of the NC device 14. Therefore, the accident of die collision owing to an error made by the operator in the entry of bending data or in die alignment can be avoided. In addition, since the moving speed of the ram is controlled, the operator can easily interrupt the operation by himself whenever he feels danger. As a result, damage to the dies and its adverse effects on the main body of the press brake can be securely prevented and the safety for the operator can be ensured.

(Second Embodiment)

Figure 8:
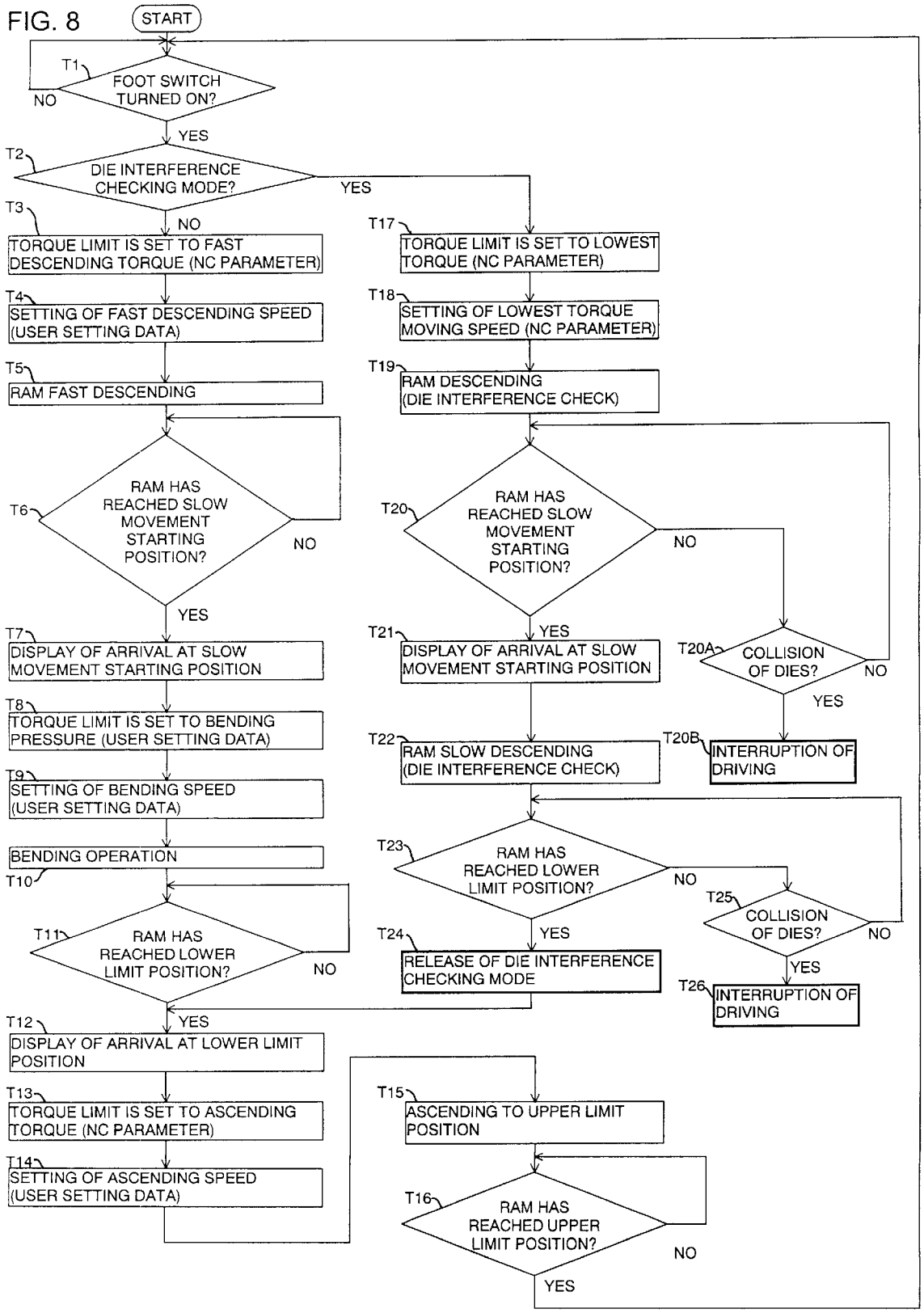
FIGS. 8 to 10 are associated with a second embodiment of the invention.

Basically, the structure of the press brake and the configuration of the control system according to the second embodiment do not differ from those of the first embodiment. Therefore, a detailed explanation on the parts and functions common to the first and second embodiments will be omitted from the following description. The features inherent to the control flow of the second embodiment (see FIG. 6) are a step arranged for the case where the ram has not reached the slow movement starting position (STEP T20) and a step arranged for the case where the ram has not reached the lower limit position (STEP T23). The steps T20 onward, which include these additional steps, will be hereinafter described with reference to FIG. 8.

STEPS T20 to T21: After the descent of the ram 2, a check is made to determine whether the ram 2 has reached the slow movement starting position. If it is determined that the ram 2 has not reached the slow movement starting position, a check is then made to determine in the flow shown in FIG. 10 (described later) whether the dies (punch 5 and die 4) have collided with each other. If so, the operation is interrupted while performing the disposal of an abnormal condition. On the other hand, if the ram 2 has reached the slow movement starting position, the arrival of the ram 2 at this position is displayed.

STEPS T22 to T24: Subsequently, the ram 2 is moved from the slow movement starting position to the lower limit position with the same set torque A' and at the same set speed (this movement is indicated by line B in FIG. 7(a)). When the arrival of the ram 2 at the lower limit position is determined, the flow proceeds to STEP T12 after releasing the die interference checking mode, thereby to raise the ram 2 with the same ascending torque C' and at the same ascending speed as those of the ordinary bending mode (this movement is indicated by line C in FIG. 7(a)).

STEPS T25 to T26: If it is determined in STEP T23 that the ram 2 has not reached the lower limit position, a check is then made similarly to the above step to determine whether the dies have collided with each other. If so, the operation is interrupted while performing the disposal of an abnormal condition.

Figure 9:
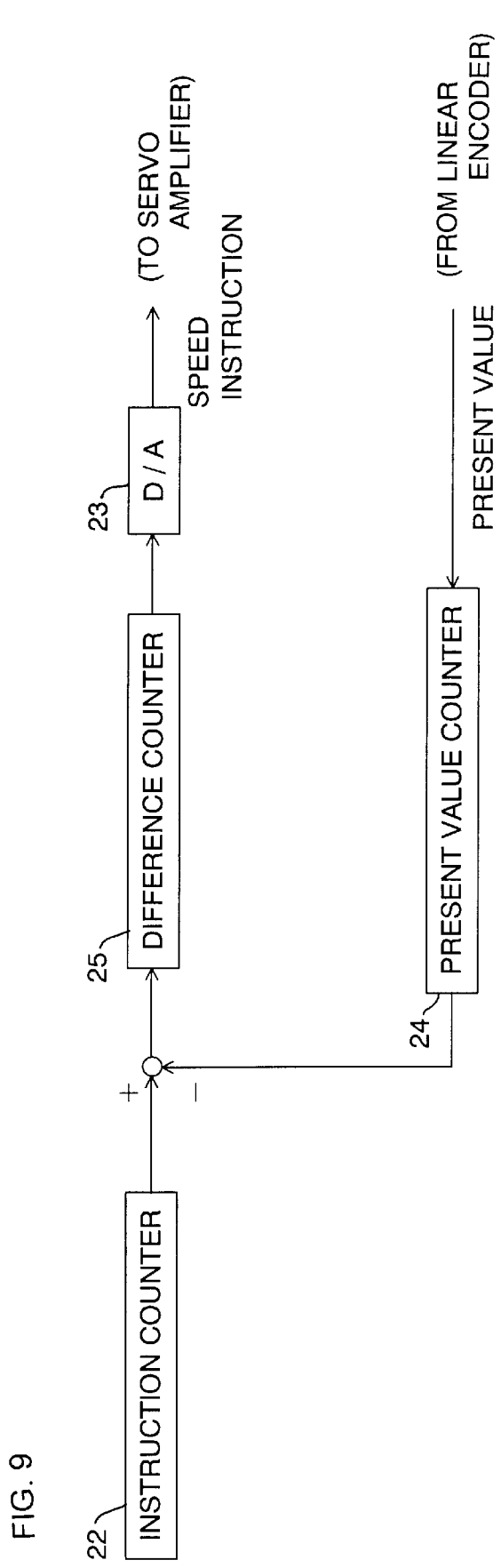

FIG. 9 shows the details of the processing performed by the NC device 14 shown in FIG. 3. In the NC device 14, an instruction sent from an instruction counter 22 is converted into a speed instruction by a D/A converter 23 to send to each servo amplifier 15. Since there is a time difference between an issue of a speed instruction and the actual speed of the ram 2 (present value), the following procedure is taken. The present value obtained from each linear encoder 13 is counted by a present value counter 24. Then, the difference between the counter value of the present value counter 24 and the counter value of the instruction counter 22 is calculated by a difference counter 25, and according to this difference, an instruction is released.

Figure 10:
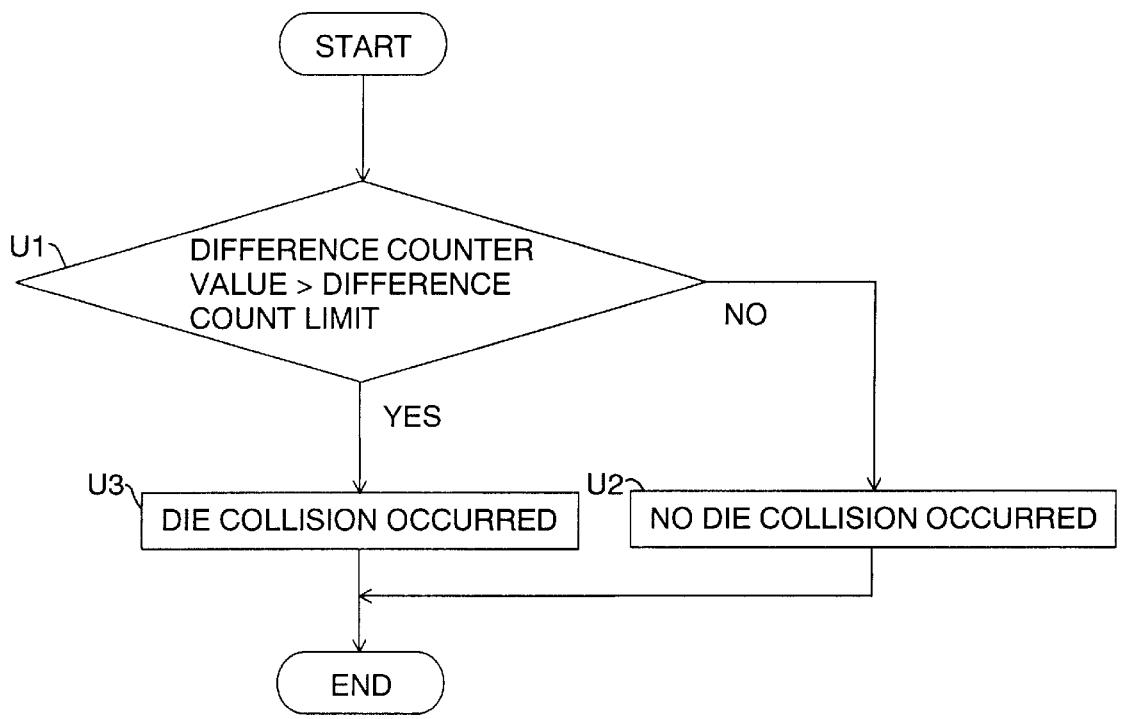

According to the instruction based on the above procedure, the determination at the steps T20A and T25 as to whether a collision of the dies has occurred is carried out as shown in FIG. 10. Specifically, a check is made to determine whether the value of the difference counter exceeds a specified difference count limit (i.e., threshold) at STEP U1. If the value of the difference counter does not exceed the difference count limit, it is then determined at STEP U2 that the dies have not collided. On the other hand, if the value of the difference counter exceeds the difference count limit, it is determined at STEP U3 that the dies have collided.

As described earlier, the second embodiment is arranged such that when it is determined that the punch 5 and the die 4 have interfered (collided) with each other during the movement of the ram 2 in the die interference checking mode described in the first embodiment, the movement of the ram 2 is interrupted and the disposal of an abnormal condition is performed. If it is determined that the punch 5 and the die 4 have not interfered, the die interference checking mode is released and the ordinary bending process is performed. Accordingly, even if the operator made an error in inputting bending data or in setting up the dies, the accident of a collision of the dies in bending operation can be avoided. As a result, damage to the dies and its adverse effects on the machine body can be avoided and, moreover, the danger to the operator can be securely prevented.

In the present embodiment, the determination as to whether a die collision has occurred when the operation is in the die interference checking mode is made based on the value of the difference counter. The determination is not necessarily made with such a value but may be made based on the present position of the ram 2 when the pressure created by the ram 2 has exceeded a specified threshold. Alternatively, it may be based on the present position of the ram 2 when the moving time of the ram 2 has exceeded a specified threshold.

In each of the foregoing embodiments, the ram is temporarily stopped in the course of descending movement in order to make the moving pattern of the ram 2 in the die interference checking mode coincident with the moving pattern in the ordinary bending mode. It is also possible to move the ram from the upper limit position to the lower limit position at the same speed without temporarily stopping it.

Each embodiment has been described with the concept of a system applied to a so-called overdrive type press brake in which an upper die is attached to the ram (movable member), with a lower die mounted on the bed (fixed member). As a matter of course, the invention can be applied to so-called underdrive type press brakes in which the lower die is attached to the ram (movable member) while the upper die being mounted on the bed (fixed member).

Although the foregoing embodiments have been described with the concept of a press brake having high operational speed and ram driving sources each composed of an AC servo motor and ball screws, it is apparent that the invention may be applied to a press brake whose ram driving source is composed of a hydraulic unit and a cylinder.

What is claimed is:

1. A ram control method for a press brake which bends a sheet-like workpiece by the cooperative movement of a movable die and a fixed die, the movable die being supported and driven by a ram, while the fixed die being supported on a fixed bed in opposing relationship with the movable die, the control method comprising a die interference checking step for setting the pressure of the ram to a certain limit value which does not cause damage in the event that the movable die and the fixed die interfere with each other and setting the moving speed of the movable die to a lowest torque moving speed according to the set limit value and for driving the ram to exert the set pressure.

2. A ram control method for a press brake according to claim 1, further comprising a die interference determining step in which it is determined whether the movable die and the fixed die have interfered with each other in the die interference checking step, and if it is determined that the dies have interfered, the movement of the ram is stopped, and if it is determined that the dies have not interfered, the die interference checking step is cancelled and the operation of the press brake proceeds to an ordinary bending step.

3. A ram control system for a press brake which bends a sheet-like workpiece by the cooperative movement of a movable die and a fixed die, the movable die being supported and driven by a ram, while the fixed die being supported on a fixed bed in opposing relationship with the movable die, the control system comprising:

(a) pressure limit setting means for setting the limit of pressure exerted on the movable die to a value which does not cause damage in the event that the movable die and the fixed die interfere with each other;

(b) moving speed setting means for setting the moving speed of the movable die to a lowest torque moving speed based on the limit value set by the pressure limit setting means; and (c) ram driving means for driving the ram at the moving speed set by the moving speed setting means.

4. A ram control system for a press brake which bends a sheet-like workpiece by the cooperative movement of a movable die and a fixed die, the movable die being supported and driven by a ram, while the fixed die being supported on a fixed bed in opposing relationship with the movable die, the control system comprising:

(a) pressure limit setting means for setting the limit of pressure exerted on the movable die to a value which does not cause damage in the event that the movable die and the fixed die interfere with each other;

(b) moving speed setting means for setting the moving speed of the movable die to a lowest torque moving speed based on the limit value set by the pressure limit setting means;

(c) interference determining means for determining whether the movable die and the fixed die have interfered with each other while the ram being driven at the moving speed set by the moving speed setting means; and (d) ram controlling means for stopping the movement of the ram if the interference determining means has determined that the movable die and the fixed die interfered with each other and for controlling the movement of the ram so as to let the operation of the press brake go into an ordinary bending step if the interference determining means has determined that the movable die and the fixed die did not interfere with each other.

5. A ram control system for a press brake according to claim 4, wherein the interference determining means determines whether the movable die and the fixed die have interfered with each other from the difference between the present moving speed of the ram and a target moving speed.

6. A ram control system for a press brake according to claim 4, wherein the interference determining means determines whether the movable die and the fixed die have interfered with each other from the position of the ram when the pressure created by the ram has exceeded a specified threshold.

7. A ram control system for a press brake according to claim 4, wherein the interference determining means determines whether the movable die and the fixed die have interfered with each other from the position of the ram when the moving time of the ram has exceeded a specified threshold.

* * * * *